(12) United States Patent
Walton

(10) Patent No.: US 11,857,107 B2
(45) Date of Patent: Jan. 2, 2024

(54) LIQUID DISPENSING SYSTEM, LIQUID FLOW CONTROL ASSEMBLY AND LIQUID DISPENSER FOR DISPENSING LIQUID AT DIFFERENT TEMPERATURES

(71) Applicant: Cardomon International Limited, Kowlon (HK)

(72) Inventor: Philip A. Walton, Bishop Auckland (GB)

(73) Assignees: CRYSTAL MOUNTAIN INTERNATIONAL LIMITED, Hong Kong (HK); DS SERVICES OF AMERICA, INC., Atlanta, GA (US)

( * ) Notice: Subject to any disclaimer, the term of this patent is extended or adjusted under 35 U.S.C. 154(b) by 579 days.

(21) Appl. No.: 16/871,370

(22) Filed: May 11, 2020

(65) Prior Publication Data

US 2021/0345821 A1 Nov. 11, 2021

(51) Int. Cl.
 A47J 31/46 (2006.01)
 A47J 31/52 (2006.01)
 A47J 31/36 (2006.01)
 A47J 31/44 (2006.01)

(52) U.S. Cl.
 CPC ......... *A47J 31/465* (2013.01); *A47J 31/3676* (2013.01); *A47J 31/4403* (2013.01); *A47J 31/5255* (2018.08)

(58) Field of Classification Search
 CPC .......... A47J 31/34; A47J 31/46; A47J 31/465; A47J 31/469; A47J 31/4475; A47J 31/4403; A47J 31/3675; A47J 31/5255; A47J 31/00; A47J 31/002; A47J 31/36; A47J 31/461; A47J 31/52; F24H 9/133
 See application file for complete search history.

(56) References Cited

U.S. PATENT DOCUMENTS

| 4,653,390 A | * | 3/1987 | Hayes ..................... A47J 31/56 392/467 |
| 8,887,955 B2 | | 11/2014 | Walton et al. |
| 9,527,714 B2 | | 12/2016 | Walton et al. |
| 10,202,270 B2 | | 2/2019 | Walton et al. |

(Continued)

OTHER PUBLICATIONS

Suntrek solar company, snapshot Jun. 29, 2017. (Year: 2017).*

(Continued)

*Primary Examiner* — Nathaniel E Wiehe
*Assistant Examiner* — Spencer H. Kirkwood
(74) *Attorney, Agent, or Firm* — Merek, Blackmon & Voorhees, LLC

(57) ABSTRACT

A liquid dispensing system, a liquid flow control assembly or member and a liquid dispenser. Preferably, the liquid dispensing system includes a single hot water tank. A liquid flow control assembly operably connected to the hot water tank is configured to direct only water from an upper portion of the hot water tank to a flavored beverage brewer (e.g., coffee or tea brewer) so that the flavored beverage is at an optimal elevated temperature when dispensed. The liquid flow control assembly or member is further configured to mix water from an upper portion of the hot water tank with water from a lower portion of the hot water tank and provide the water mixture to a hot water dispensing nozzle or outlet of the liquid dispenser to reduce the temperature of the water directed to the hot water dispensing nozzle or outlet.

21 Claims, 7 Drawing Sheets

(56) References Cited

U.S. PATENT DOCUMENTS

| | | |
|---|---|---|
| 10,781,093 B2 | 9/2020 | Walton et al. |
| 10,807,854 B2 | 10/2020 | Walton et al. |
| 11,390,513 B2 | 7/2022 | Walton et al. |
| 2005/0279215 A1 | 12/2005 | Cai |
| 2010/0212333 A1 | 8/2010 | Moon |
| 2017/0273498 A1* | 9/2017 | Singh ................... A47J 31/56 |
| 2018/0024574 A1* | 1/2018 | Goodjohn ............. F24H 15/315 |
| | | 700/300 |
| 2019/0053656 A1* | 2/2019 | Locher ................. A47J 31/542 |
| 2020/0024122 A1 | 1/2020 | Walton et al. |
| 2020/0385258 A1 | 12/2020 | Walton et al. |

OTHER PUBLICATIONS

International Search Report dated Aug. 13, 2021 issued in connection with International Application No. PCT/IB2012/053920, four (4) pages.
U.S. Appl. No. 16/986,125, filed Aug. 20, 2020 and pending.

\* cited by examiner

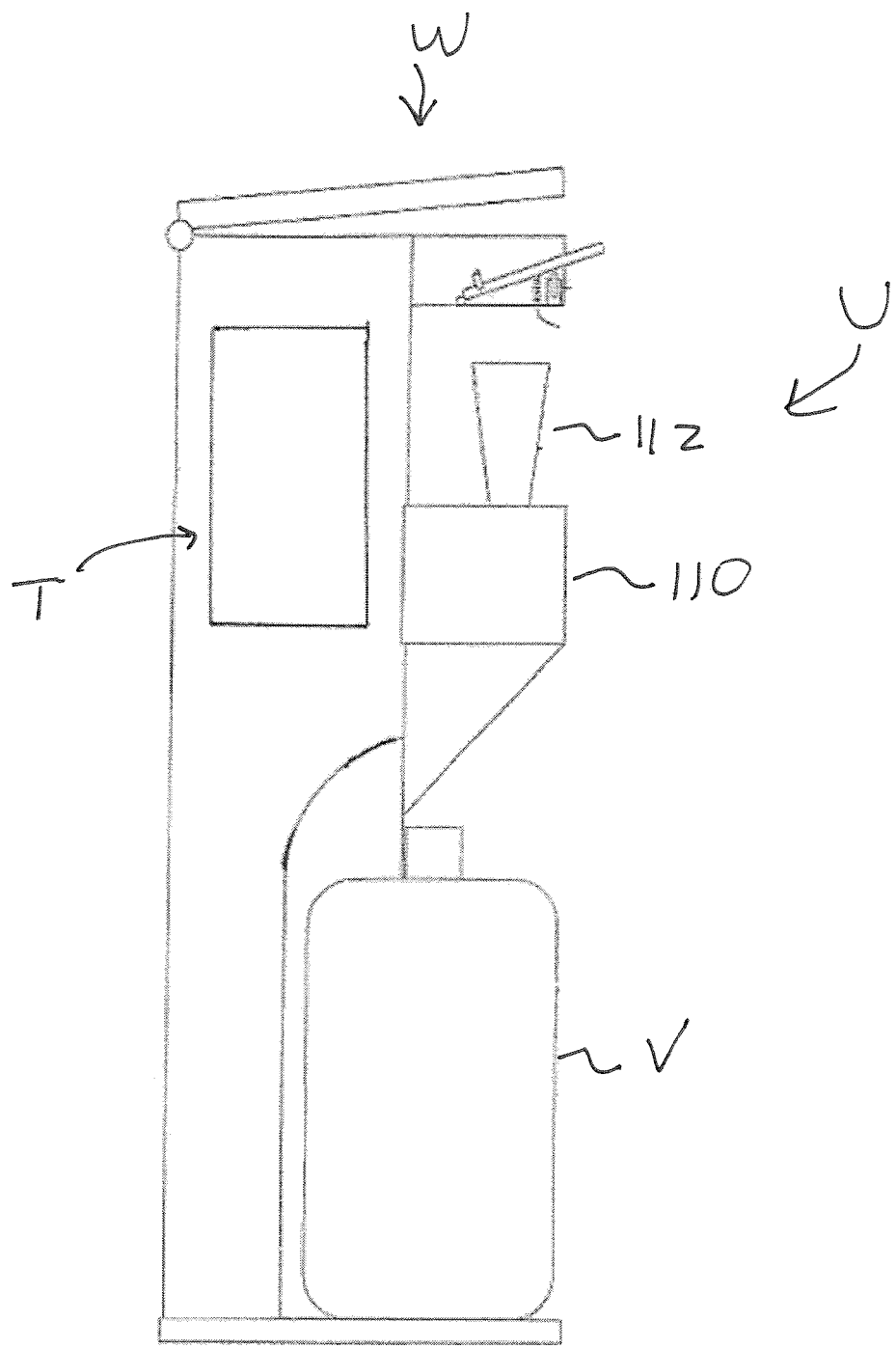

LIQUID DISPENSING SYSTEM, LIQUID FLOW CONTROL ASSEMBLY AND LIQUID DISPENSER FOR DISPENSING LIQUID AT DIFFERENT TEMPERATURES

FIELD OF THE INVENTION

A preferred form of the present invention is directed to a liquid dispensing system, a liquid flow control assembly and/or a liquid dispenser for dispensing liquids at different temperatures. In a most preferred form, water at an optimal elevated temperature for dispensing a flavored beverage (e.g., coffee, tea, etc.) is provided and water at a lower but still elevated temperature for water is provided for dispensing hot water from a single hot water storage device (e.g., hot water tank, hot water reservoir, hot water container, etc.). The dispensing system may also dispense a chilled or cold liquid. The dispensing system may be connected to a replaceable five (5) gallon liquid storage bottle housed in and/or operably connected to the liquid dispenser (e.g., top-loaded liquid dispenser or a bottom-loaded liquid dispenser). The liquid dispensing system may be connected to other liquid sources including but not limited to one or more smaller liquid storage bottles or containers that are used in counter-top liquid dispensers. The liquid dispensing system may further be directly connected to existing plumbing of a house, apartment, office, store or other commercial or residential structure in which the liquid dispenser is stored or housed. In a most preferred form, the liquid dispenser is a coffee cooler that dispenses water at one or more temperatures (e.g., hot water, cold or cool water and/or water at ambient temperature) and a flavored beverage (e.g., coffee, tea, etc.) at an optimal elevated temperature from a combination water and flavored beverage cooler or dispenser.

BACKGROUND OF THE INVENTION

Numerous liquid dispensers have been developed that dispense consumable liquids including but not limited to hot water, chilled or cold water and/or a flavored beverage (e.g., coffee, tea, etc.) Liquid dispensers that dispense a hot consumable liquid have been designed to include a dispensing mechanism that provides a degree of child safety, e.g., a lever requiring two separate operations to prevent or reduce a child or other user from being scolded with a hot liquid. It is also generally the case that the temperature of the hot consumable liquid (e.g., water) dispensed by conventional liquid dispensers is no higher than about 185° F. (85° C.) thus limiting the potential threat of scalding hazards. However, it is generally recognized that the ideal temperature for brewing coffee is between 195° F. & 205° F. (90.5° C. & 96° C.). This ideal temperature range for dispensing coffee increases the potential threat of scalding.

The preferred forms of the present invention address one or more shortcomings of previously known liquid dispensers as discussed below or as will be readily apparent from the following discussion.

OBJECTS AND SUMMARY OF THE INVENTION

An object of a preferred embodiment of the present invention is to provide a novel and unobvious liquid dispenser, a liquid flow control assembly or member and/or a liquid dispensing system for dispensing liquids.

Another object of a preferred from of the present invention provides a new and innovative liquid dispensing system, liquid flow control assembly or member and/or a liquid dispenser in which a flavored beverage and hot water are dispensed at two distinctly different temperatures and/or two distinctly different flow rates.

A further object of a preferred from of the present invention provides a new and innovative liquid dispensing system, liquid flow control assembly or member and/or liquid dispenser which provides liquid from a single liquid storage tank, reservoir or container at two different temperatures.

A still another object of a preferred form of the present invention includes a water flow control assembly or member operably connected to a single water tank to provide water from the single water tank at different temperatures to two different dispensing members/units/outlets of a liquid dispenser.

A still further object of a preferred from of the present invention is to provide a coffee cooler in which water from only an upper portion of a hot water tank, reservoir, container or other liquid retaining or holding structure is directed to a flavored beverage brewer (e.g. coffee or tea brewer) and water from an upper portion of the hot water tank, vessel, container, reservoir or other liquid retaining or holding structure is mixed with water from a lower portion of the same hot water tank, vessel, container, reservoir or other liquid retaining or holding structure and fed to a hot water dispensing nozzle, outlet or other dispensing structure so that the water fed to the hot water dispensing structure or device is at a different temperature (e.g., lower) than the water fed or directed to the flavored beverage brewer.

Yet another object of a preferred form of the present invention is to provide a liquid flow control assembly or member operably connected to a liquid storage reservoir, tank, container or other liquid retaining structure that utilizes the venturi effect to provide liquid at different temperatures to two different dispensing members/units/outlets of a liquid dispenser.

Yet a further object of a preferred form of the present invention is to provide an apparatus configured to provide hot water at two different temperatures from a single hot water tank, reservoir, container or other liquid retaining structure.

Another object of a preferred form of the present invention includes a manifold operably connected to a single hot water tank, reservoir, container or other liquid retaining structure to provide hot water at two different temperatures from the single hot water tank, reservoir, container or other liquid retaining structure.

A further object of a preferred form of the present invention includes a liquid flow control assembly or member that utilizes the venturi effect to provide hot water at two different temperatures from a single hot water tank, reservoir, container or other liquid retaining structure to two different dispensing components or devices of a liquid dispenser.

It must be understood that no one embodiment of the present invention need include all of the aforementioned objects of the present invention. Rather, a given embodiment may include one or none of the aforementioned objects. Accordingly, these objects are not to be used to limit the scope of the claims of the present invention.

In summary, one preferred embodiment of the present invention is directed to a liquid dispensing system for a liquid dispenser. The liquid dispensing system includes a reservoir (i.e., any structure that retains, holds or stores one or more liquids) including an inlet for receiving a liquid from a liquid supply source, a chamber for storing the liquid received from the liquid supply source and an outlet for directing the liquid out of the chamber. A manifold is operably connected to the reservoir (preferably the manifold is detachably connected to the reservoir to allow all components of the manifold to be removed as a single unit from the liquid dispenser). The manifold includes a first port through which liquid from the upper portion of the chamber and liquid from the lower portion of the chamber are directed to a first dispensing outlet so that liquid from the upper portion of the chamber and liquid from the lower portion of the chamber mix prior to being dispensed from the first dispensing outlet. The manifold further includes a second port through which liquid from only the upper portion of the chamber is directed to a second dispensing outlet wherein the temperature of liquid directed to the first dispensing outlet is at a temperature different (e.g., lower) from the temperature of liquid directed to the second dispensing outlet.

Another preferred embodiment of the present invention is directed to an apparatus for a hot water tank (i.e., any structure that retains, holds or stores one or more liquids) of a water dispensing system of a beverage dispenser for providing hot water at two different temperatures. The apparatus includes a liquid flow control assembly having at least a manifold configured to be operably connected to a hot water tank. The manifold includes a first port through which water from an upper portion of the hot water tank and water from a lower portion of the hot water tank are directed to a first dispensing outlet so that water from the upper portion of the hot water tank and water from the lower portion of the hot water tank mix prior to being dispensed from the first dispensing outlet. The manifold further includes a second port through which water from only the upper portion of the hot water tank is directed to a second dispensing outlet wherein the temperature of water directed to the first dispensing outlet is at a lower temperature than the temperature of water directed to the second dispensing outlet.

A further preferred embodiment of the present invention is directed to a coffee cooler for separately dispensing cold water, a flavored beverage and hot water. The coffee cooler includes a cold water source for providing cold or chilled water. A hot water reservoir (i.e., any structure that retains, holds or stores one or more liquids) is operably connected to the cold water source to receive water from the cold water source. The hot water reservoir includes a heating element to heat water stored in the hot water reservoir (e.g., a heating element partially of completely disposed in the reservoir or partially or completely external to the hot water reservoir but operably connected thereto). A water flow control assembly is operably connected to the hot water reservoir. The water flow assembly control is configured to provide water from only an upper portion of the hot water reservoir to a flavored beverage brewing device. The water flow control assembly is further configured to provide water to a hot water dispensing nozzle of the coffee cooler which is a mixture of water from a lower portion of the hot water reservoir and water from an upper portion of the hot water reservoir so that the temperature of the water provided to the flavored beverage brewing device is higher than the temperature of the water provided to the hot water dispensing nozzle of the coffee cooler.

The above preferred forms of the present invention described above provide various examples of preferred embodiments of the present invention and are not to be construed as limiting the present invention to any of the preferred forms described above. The present invention is only to be limited by the prior art, i.e., no portion of this description is to be read as limiting the present invention in a manner narrower than required by the prior art.

BRIEF DESCRIPTION OF THE DRAWINGS

FIG. 7 is a schematic view of one of many types of liquid dispensers in which a liquid dispensing system and/or the liquid flow control assembly or member formed in accordance with a preferred embodiment of the present invention can be used.

DETAILED DESCRIPTION OF THE PREFERRED EMBODIMENT OF THE INVENTION

The preferred forms of the invention will now be described with reference to FIGS. 1-7 and the corresponding descriptions. The appended claims are not limited to the preferred forms and no term and/or phrase used herein is to be given a meaning other than its ordinary meaning unless it is expressly stated otherwise. The present invention is only to be limited by the prior art, i.e., no portion of this description is to be read as limiting the present invention in a manner narrower than required by the prior art.

FIGS. 1 THROUGH 7

Preferred forms of the present invention are directed to a liquid dispensing system, a liquid flow control assembly or member and/or a liquid dispenser for dispensing liquids at different temperatures. In a most preferred form, water at an optimal elevated temperature for dispensing a flavored beverage (e.g., coffee, tea, etc.) is provided and water at a lower but still elevated temperature is provided for dispensing hot water from a single hot water storage device (e.g., hot water tank, hot water reservoir, hot water container/vessel, etc.). The dispensing system may also dispense a chilled or cold liquid. The dispensing system may be connected to a replaceable five (5) gallon liquid storage bottle housed in and/or connected to the liquid dispenser (e.g., top-loaded liquid dispenser or a bottom-loaded liquid dispenser). The liquid dispensing system may be connected to other liquid sources including but not limited to one or more smaller liquid storage bottles, containers, reservoirs or vessels that are used in counter-top liquid dispensers. The liquid dispensing system alternatively may be directly connected to existing plumbing of a house, apartment, office, store or other commercial or residential structure.

While the preferred forms the present invention are directed to a liquid dispensing system, a liquid flow control assembly or member and/or a liquid dispenser for dispensing a heated flavored beverage at an optimal elevated temperature and hot water at a lower but still elevated temperature than the flavored beverage, the present invention is not limited to one or more components (e.g., a liquid dispensing system, a liquid flow control assembly or member and/or a liquid dispenser for dispensing liquids) for dispensing a flavored beverage at an optimal elevated temperature and hot water at a lower but still elevated temperature than the flavored beverage wherein the water is provided for both liquids from a single hot water storage device or structure. For example, both liquids provided by the single water (e.g., hot water, ambient temperature water, cool water or cold water) storage device or structure could be unflavored water at two or more different temperatures or two flavored beverages at two or more different temperatures.

Figure 1:
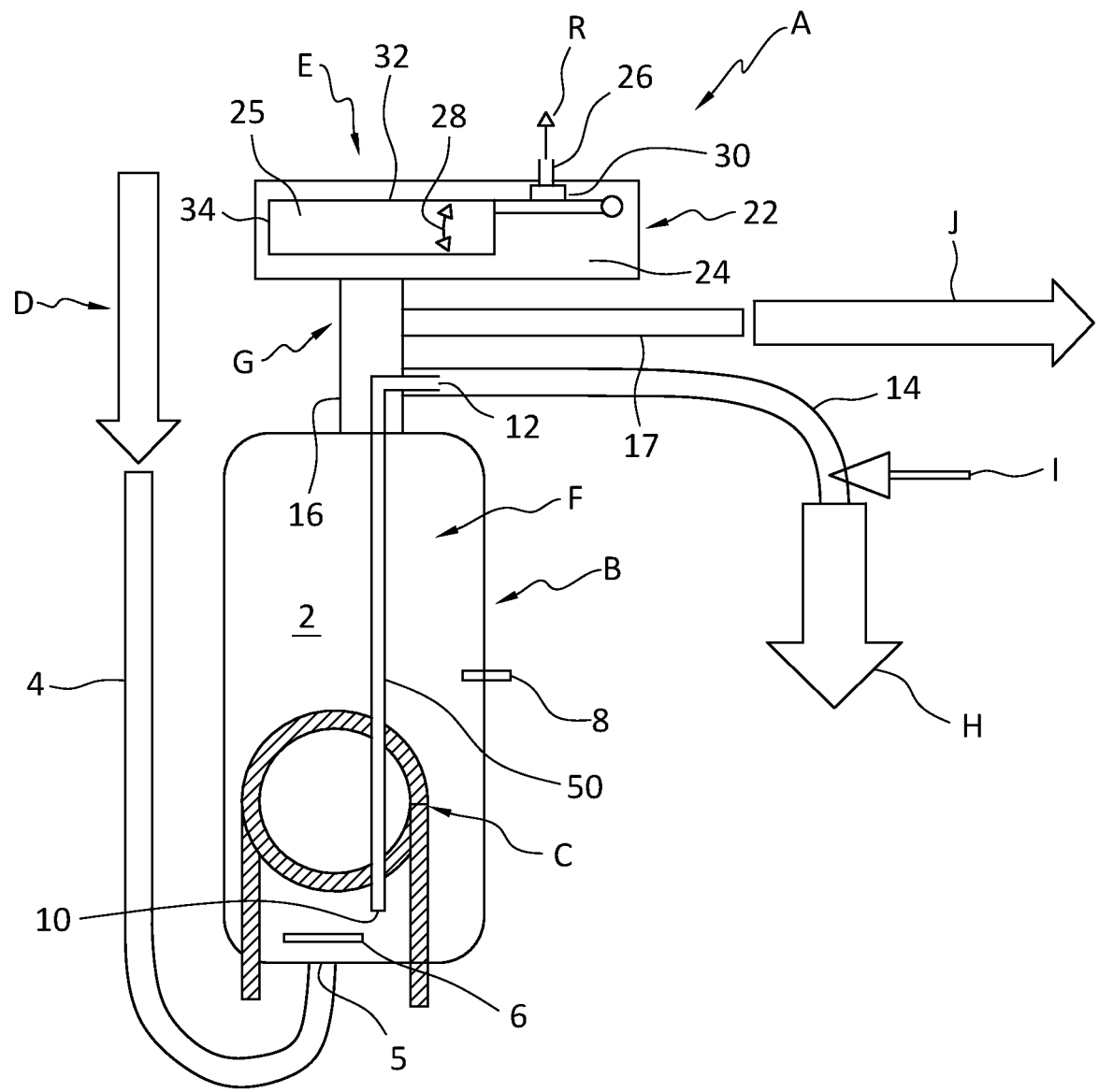
FIG. 1 is a schematic view of a portion of a liquid dispensing system formed in accordance with a preferred embodiment of the present invention that can be used in many different liquid dispensers and/or liquid dispensing systems.

Referring to FIG. 1, a schematic view of a preferred liquid dispensing system A employing a preferred form of the invention is illustrated in one of many possible configurations. In the most preferred form, liquid dispensing system A is configured to direct hot water at a first temperature to a hot water dispensing nozzle, outlet, conduit or other dispensing structure of a liquid dispenser and hot water at a second temperature to a flavored beverage brewing assembly, unit or outlet of a liquid dispenser wherein the first temperature is different from the second temperature. Preferably, the temperature of hot water directed or provided to the hot water dispensing nozzle or other dispensing structure is no higher than 185° F. and the temperature of hot water directed or provided to the flavored beverage brewing assembly, unit or outlet is in a range of 195° F. to 205° F. However, each of the temperatures or temperature ranges may be varied as desired. Preferably, the liquid dispenser is configured such that the dispensing flow rate of hot water from the hot water dispensing nozzle is higher than the dispensing flow rate of the flavored beverage dispensed from the liquid dispenser.

The liquid dispensing system A includes a single hot water tank, reservoir, container, vessel or other liquid storage, holding or containing structure B having a heating element C (e.g., heating coil or coils) wherein a portion of heating element C is shown as being disposed in chamber 2 of container B. However, liquid in container B may be heated using any suitable heating device or member including but not limited to a heating element located partially or completely external to member B. As shown in FIG. 1, water is supplied by liquid conduit, tube or member 4 to the bottom portion or inlet 5 of reservoir B such that water enters reservoir B at preferably a lowermost portion of chamber 2 of reservoir B from a water source D. The water entering inlet 5 and the water housed in the bottom portion of reservoir B will be at approximately the same temperature as the water in the water supply source (e.g., a cold or cool water storage device or a storage device storing water at ambient temperature). Arrow D in FIG. 1 schematically represents cooled or cold water being supplied to member 4 from a cooled or cold water supply source not shown in FIG. 1. Preferably, the cooled or cold water supply source is a cold water reservoir, tank, vessel or container housed in or operably connected to the liquid dispenser (e.g., coffee cooler). However, the source of water supplied to hot water tank B can be from a source having ambient temperature water or any other suitable water source.

Preferably, a baffle 6 is provided in the lower portion of chamber 2 of member B to limit turbulence caused by incoming water and to keep water in the upper portion of chamber 2 at a higher temperature from that of the water in the lower portion of chamber 2. Preferably, the temperature of water in the upper portion of chamber 2 is in the range of 195° F. to 205° F. However, this temperature range may be varied as desired. A temperature control sensor 8 is operably connected to chamber 2 and heating element C to maintain water in the upper portion of chamber 2 at the desired temperature or within the desired temperature range. Sensor 8 can take any known or subsequently developed form.

Referring to FIGS. 1 and 4 to 6, a liquid flow control assembly E is operably connected to container, tank, vessel or reservoir B. The liquid flow control assembly E preferably includes a liquid flow control F operably connected to liquid manifold G. Liquid flow control F can take the form of one or more conduits, tubes or other structures for conveying liquid. The lower open end 10 of liquid flow control F is located/positioned/operationally disposed in the lower portion of chamber 2, preferably above baffle 6. Upper open end 12 of liquid flow control F is preferably positioned in or operably connected to liquid passageway 14 configured to direct hot water to a hot water dispensing outlet, nozzle or other dispensing structure represented by arrow H in FIGS. 1 and 2. Liquid passageway 14 has an internal diameter or width that is sized to be larger than the external diameter or width of the portion of liquid flow control F disposed in liquid passageway 14 so that liquid can flow into passageway 14 around the portion of liquid flow control F positioned in or operably connected to passageway 14. This configuration allows liquid to be supplied to liquid passageway 14 from the lower portion of chamber 2 through liquid flow control F and from the upper portion of chamber 2 through annular collar 16 of manifold G and corresponding port 18 (shown in, for example, FIGS. 2 and 4 to 6) of manifold G.

As seen in FIGS. 1, 2 and 4 to 6, port 18 preferably has an internal diameter or width which is larger than the external diameter or width of horizontally extending section 20 of the liquid flow control F. The relative sizing of section 20 and port 18 allows liquid to flow into port 18 around section 20 from tank B.

Referring to FIG. 1, manifold G includes a steam valve housing 22 in fluid communication with annular collar 16 and hot water tank B. Housing 22 includes a float chamber 24, a float valve 25 pivotally mounted in float chamber 24 and steam release port 26. Arrows 28 in FIG. 1 illustrate how valve 25 pivots upwardly and downwardly in float chamber 24 to engage and disengage from port 26. Float valve 25 includes a sealing member 30 which seals port 26 when a sufficient amount of water or other liquid is in float chamber 24 to cause valve 25 to pivot upwardly to cause member 30 to engage and seal a lower portion of port 26 to prevent the discharge of a fluid (e.g., steam) from chamber 24 through port 26. FIG. 1 depicts sealing member 30 in a position sealing port 26.

Figure 4:
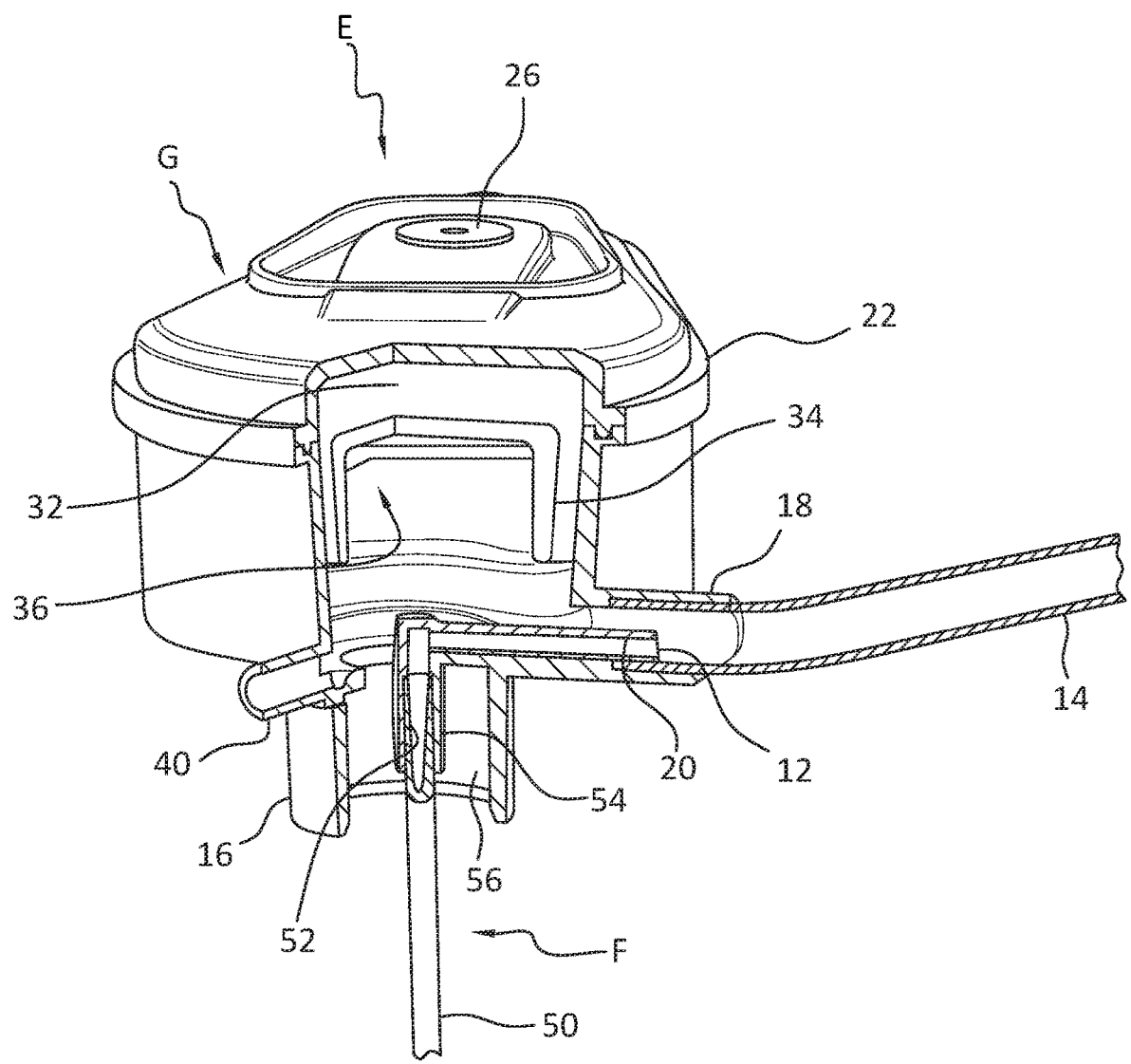
FIG. 4 is a fragmentary perspective view of a liquid flow control assembly and operably connected liquid conduit formed in accordance with a preferred embodiment of the present invention.

As steam builds up in float chamber 24 during operation of the liquid dispensing system, water or other liquid in float chamber 24 is forced out of chamber 24 causing valve 26 to pivot downwardly so that sealing member 30 is moved downwardly and away from port 26 to allow steam to be discharged or exhausted from float chamber 24 through port 26. Referring to FIGS. 1 and 4, float valve 24 includes a horizontally extending upper surface 32 and an outer peripheral and vertically extending skirt 34 connected to and extending downwardly from upper surface 32. Upper surface 32 and skirt 34 form a cavity 36 for receiving fluid (e.g. steam or liquid). Sealing member 30 is connected to and extends upwardly from upper surface 32 of float 25.

Referring to FIG. 1, arrow I represents a lever or other known device that may be activated to cause the liquid dispenser to dispense hot water from hot water dispensing member or outlet H. Referring to FIGS. 1 and 4 to 6, manifold G includes a port 40 connected to liquid passageway 17. Liquid passageway 17 (shown in, for example, FIG. 1) directs hot water from only the upper portion of chamber 2 to a flavored beverage brewing unit or outlet represented schematically by arrow J in FIG. 1. Port 40, like port 18, is in fluid communication with annular collar 16 and float chamber 24 so that liquid flows into the annular collar 16 and subsequently flows from the float chamber 24 into the corresponding port. However, port 18 and/or port 40 can be connected to annular collar 16 so that liquid passes directly from annular collar 16 into the corresponding port without first passing into float chamber 24.

Annular collar 16 of manifold G can be sized so that a throat of hot water tank B extends into the internal cavity defined by annular collar 16. One or more sealing members may be formed in the annular collar 16 and/or the throat of the member B or be formed as a separate piece from members 16 and B to provide a sealed connection between member 16 and member B. Alternatively, the throat of hot water tank B can be sized to receive the annular collar 16 in the internal cavity or space defined by the throat of the hot water tank B. It should be noted that manifold G can be connected to hot water tank B in a sealed manner in any other suitable manner.

Figure 5:
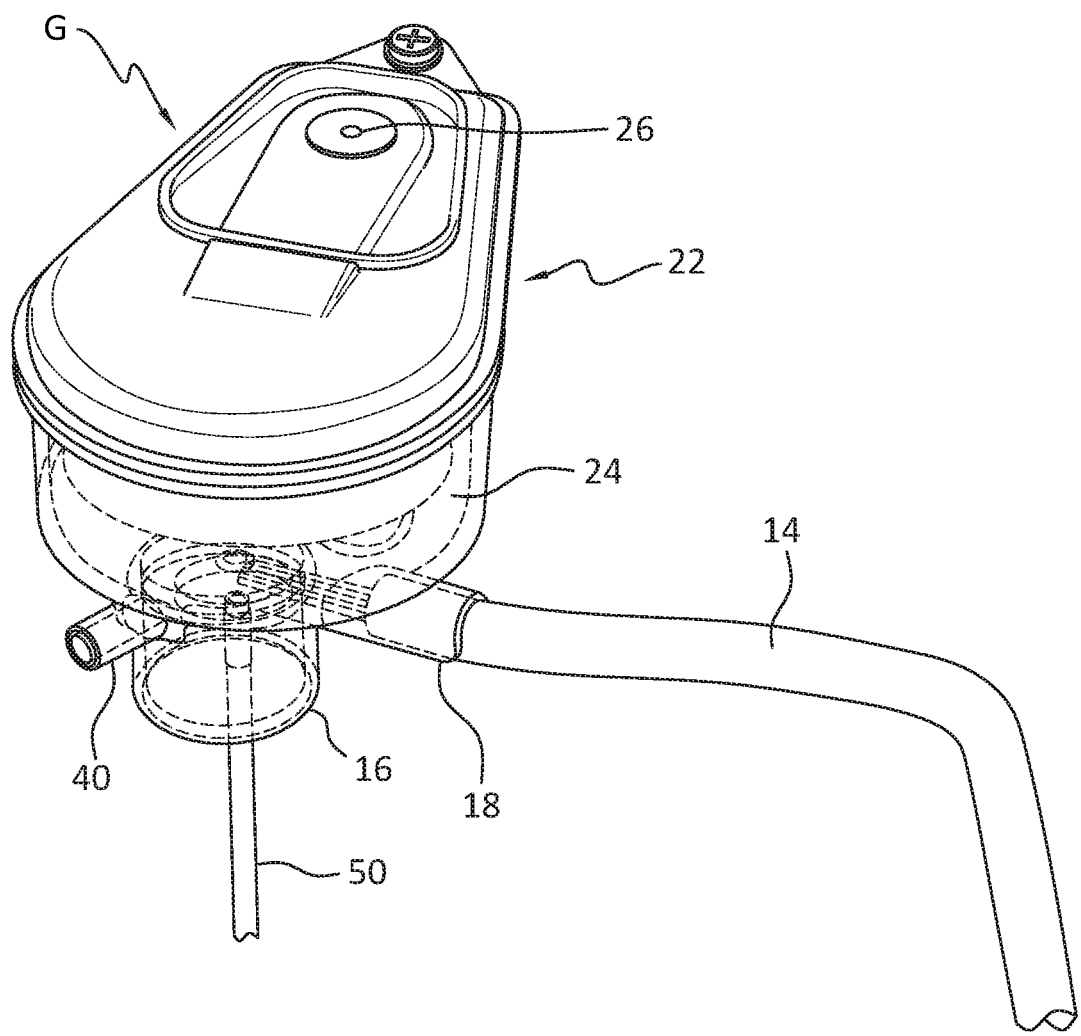
FIG. 5 is a fragmentary perspective view of the liquid flow control assembly and the liquid conduit depicted in FIG. 4 with portions of the manifold for the liquid flow control assembly shown as being transparent for illustration purposes.
Figure 6:
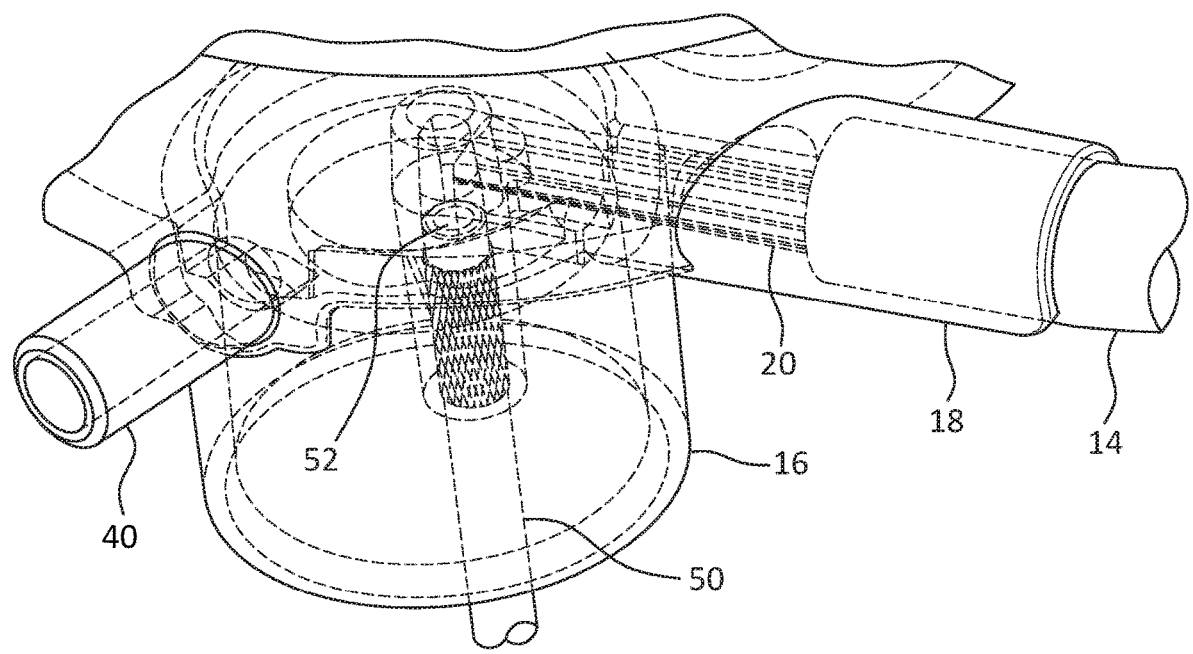
FIG. 6 is an enlarged perspective view of a portion of the liquid flow control assembly and the liquid conduit depicted in FIGS. 4 and 5 with portions of the manifold for the liquid flow control assembly shown as being transparent for illustration purposes.

Referring to FIGS. 4 to 6, liquid flow control F includes a vertically extending conduit 50 which has an open lowermost end (not shown in FIGS. 4 to 6 but shown in FIG. 1 by reference numeral 10) and an open uppermost end 52. Preferably, conduit 50 is made of metal (e.g., stainless steel or any other suitable metal). The upper portion of conduit 50 extends into vertically extending section or conduit 54 which is in fluid communication with section 20 which in turn is in fluid communication with port 18 as clearly shown in, for example FIG. 4. Preferably, member 54 and port 18 are made from a non-metallic material (e.g., plastic or any other suitable non-metallic material). Member 54, port 18, section 20 and/or housing 22 can be formed as a single piece of non-metallic material. This construction or interconnection of conduit 50, conduit 54, section 20 and port 18 allows water from the lower portion of chamber 2 to pass upwardly into conduit 50, then into conduit 54, then into section 20 and then into port 18 and then subsequently into conduit 14.

Vertically extending conduits 50 and 54 are spaced inwardly from inner, annular surface 56 of annular collar 16 as seen in, for example, FIG. 4. Housing 22, annular collar 16, port 18, conduit or section 20, port 40 and conduit 54 can be formed from a single piece of transparent material.

Preferably, manifold G is detachably connected to hot water tank B so that manifold G can be readily separated from hot water tank B and readily removed from the liquid dispenser. Also, liquid flow control assembly E is preferably configured so that all components of manifold G and all components of liquid flow control F can be removed from the liquid dispenser as a single unit.

Figure 2:
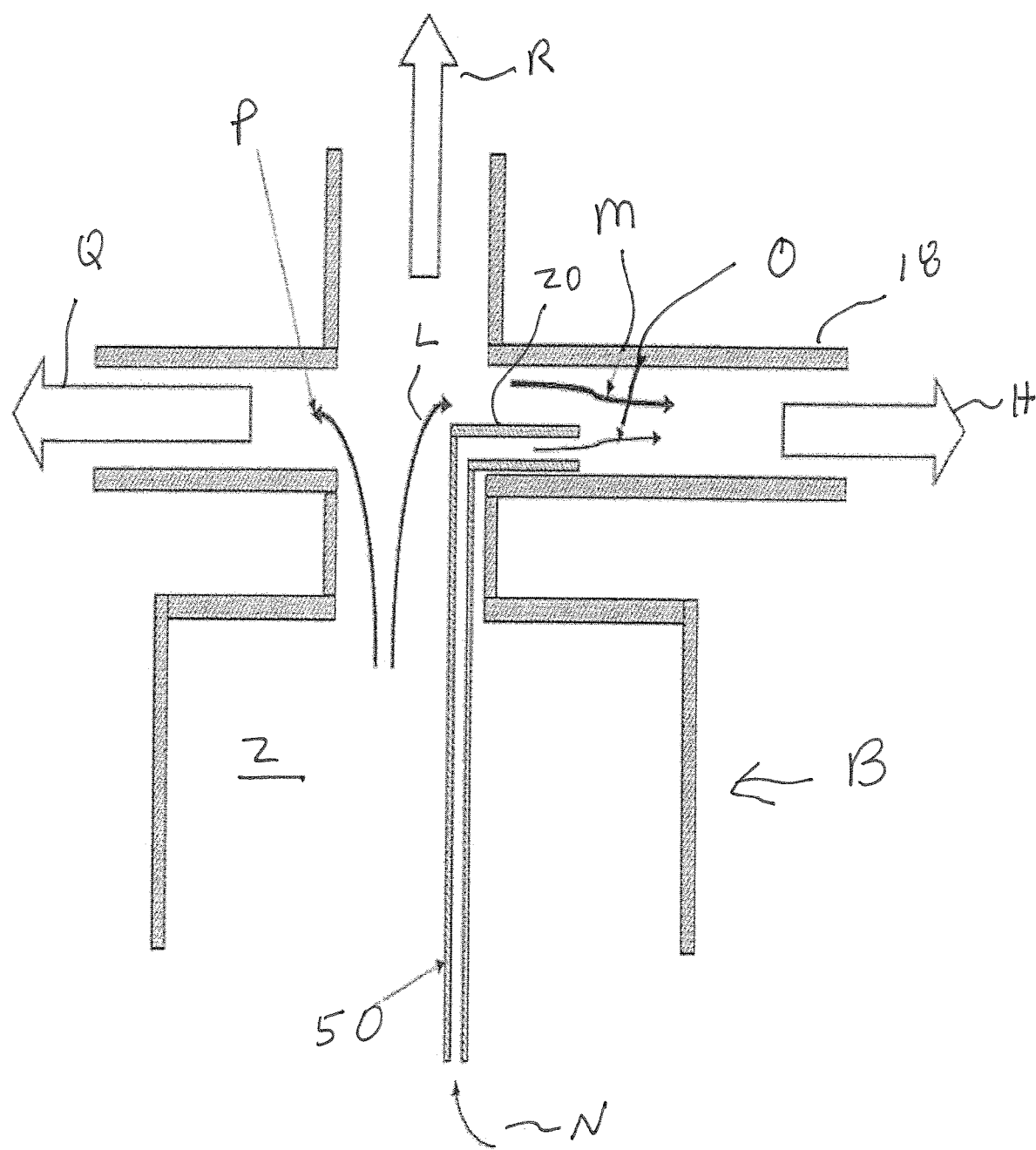
FIG. 2 is a schematic view showing flow paths of liquids through a portion of a liquid dispensing system formed in accordance with a preferred embodiment of the present invention.

Referring to FIG. 2, the flow of liquid from hot water reservoir, tank, vessel, container or other liquid retaining/hold structure B through the liquid flow control assembly E during various cycles, phases or stages of operation of the liquid dispenser (e.g., coffee cooler) will now be discussed. During a hot water dispense cycle, phase or stage, heated liquid from the upper portion of chamber 2 of hot water reservoir B passes upwardly along vertically extending conduit 50 (the flow path being represented by arrow L) and then into port 18 to pass horizontally along an exterior surface of section or conduit 20 of liquid flow control assembly E (represented by arrow M) so that hot water from the upper portion of chamber 2 of member B is directed into port 18 and conduit 14. This movement or flow of liquid from member B and vertically along conduit 50 and horizontally along section or conduit 20 causes liquid in the lower portion of chamber 2 of member B (which is preferably at a reduced temperature from the liquid drawn from the upper portion of chamber 2 of member B) to be drawn into conduit 50 (represented by arrow N) and upwardly through conduits 50 and 54 and into section or conduit 20 and then into port 18 and conduit 14 (represented by arrow O) by the venturi effect.

While the venturi effect is the preferred form of conveying liquid from the lower portion of member B into port 18 and/or conduit 14, a pump or other structure could be used to direct water or other liquid from the lower portion of chamber 2 of member B to mix with water from the upper portion of chamber 2 prior to hot water being dispensed from the liquid dispenser during a hot water dispense cycle, stage or phase to reduce the temperature of the water dispensed during a hot water dispense cycle, stage or phase. Arrow N, in FIG. 2, illustrates/represents water drawn into conduit 50 from the lower portion of chamber 2 of member B by the venturi effect. Arrow O, in FIG. 2, illustrates/represents water passing into section 20 and into port 18 by the venturi effect. The mixing of liquid from the lower portion of chamber 2 and the upper portion of chamber 2 in port 18 and/or conduit 14 significantly reduces the temperature of hot water dispensed during the hot water dispensing cycle, phase or stage of the liquid dispenser. As previously explained, the temperature of water in the upper portion of chamber 2 is preferably in the range of range of 195° F. to 205° F. The temperature of water dispensed during the hot water dispensing cycle, phase or stage is preferably no higher than 185° F. so that the preferred embodiment of the present invention causes a reduction of at least 10° F. in the water actually dispensed during a hot water dispensing cycle, phase or stage from the temperature of water in the upper portion of chamber 2, i.e., the water in the lower portion of chamber is at a temperature such that when mixed with the water in the upper portion of chamber 2 will cause a reduction of preferably at least 10° F.

Arrow P, in FIG. 2, represents water flowing from only the upper portion of chamber 2 into port 40 during a brewing cycle, stage or phase of the liquid dispenser. Arrow Q, in FIG. 2, represents elevated temperature hot water (e.g., 195° F. to 205° F.) being directed to the brewing unit or member so that coffee or other flavored beverage is at a temperature in the range of preferably 195° F. to 205° F. Arrow R, in FIG. 2, represents steam being released from port 26 of manifold G.

Figure 3:
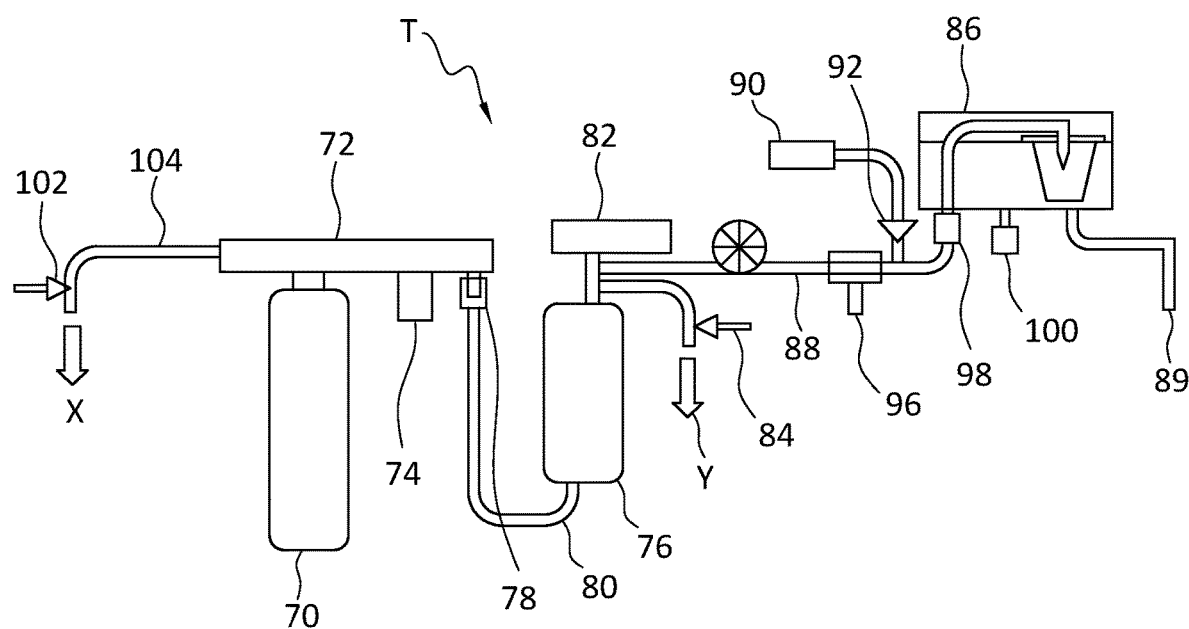
FIG. 3 is a schematic view of a liquid dispensing system in which a preferred form of the present invention can be used.

FIG. 3 depicts one of many possible liquid dispensing assemblies/units/systems T in which the preferred forms of the present invention can be utilized. The liquid dispensing assembly T preferably includes a cold or cooled water reservoir 70 operably connected to liquid manifold 72.

Liquid manifold 72 at member 74 (e.g., inlet port) receives a supply of water which manifold 72 directs into reservoir 70. Manifold 72 can take the form of the well-known SMARTFLO® removable water cartridge disclosed in U.S. Pat. Nos. 8,887,955 and/or 9,527,714. The supply of water connected to member 74 can be an ambient temperature liquid storage container (e.g., a five gallon water bottle) stored in or operably connected to the liquid dispenser (e.g., a bottom loaded dispenser or a top loaded dispenser). However, the liquid supply can be any of the previously described structures or any other suitable liquid supply.

Referring to FIG. 7, liquid dispenser U is a bottom loaded dispenser with ambient temperature liquid container V (e.g., a five gallon water bottle) stored in a lower portion of liquid dispenser U and connected to member 74 of manifold 72 using any suitable connecting member or members. However, the present invention can be used with any suitable liquid dispenser including but not limited to a top-loaded liquid dispenser and a liquid dispenser configured to be mounted on a countertop, table or other elevated structure. Alternatively, the supply of water can be a direct connection to the water source of the structure in which the liquid dispensing system is operationally positioned.

Liquid dispenser U includes a cover W operably movably/pivotally connected to the dispenser housing of the liquid dispenser U so that components of the liquid dispenser system can be removed including but not limited to the removal of liquid flow control assembly E as a single unit. The liquid dispenser housing can take the form of the housing of the STORM® water cooler or any other type of housing. Alternatively, the housing, cover and/or beverage brewing unit of the liquid dispenser U can take the form disclosed in U.S. Patent Publication No. 2020/0024122.

Referring to FIG. 3, removable liquid manifold 72 directs cooled or cold water from reservoir 70 to the lowermost portion of hot water retaining structure 76 via member, port 78 and conduit 80. Preferably, member 76 is the same or similar to member B. Liquid flow control assembly 82 is the same or similar to liquid flow control assembly E. Member 84 is the activation member (e.g., lever) to dispense hot water represented by arrow Y from liquid dispenser U. Brewing element 86 is operably connected to hot water member 76 via conduit 88. In a preferred form, brewing element 86 is configured to receive a pod for dispensing a single serving of a flavored beverage (e.g., coffee, tea, etc.). Member 89 is a flavored dispensing nozzle, outlet or other dispensing structure for dispensing a flavored beverage (e.g., coffee, tea, etc.) from liquid dispenser U.

Air pump 90 is activated for a predetermined period (e.g., preferably a short period) to flush any residual water out of the single-serving pod and the flavored beverage dispensing assembly 86 to allow the user to remove the single-serving pod and/or the flavored beverage dispensing assembly 86 with minimal dripping upon removal of the single-serving pod and/or the flavored beverage dispensing assembly 86. A one-way valve 92 prevents water from flowing back to air pump 90.

A flow measuring unit/device 94 is connected to conduit 88 to measure the flow of water through conduit 88, for example, to make sure that the flow rate of the flavored beverage is lower than the flow rate of the hot water dispensed by member 84. A solenoid valve 96 is connected to conduit 88 to control the flow of hot water to inlet port 98 of the flavored beverage dispensing assembly 86. A switch 100 detects when the cover of the liquid dispenser is in a closed position. Manifold 72 during a cold or cooled water dispensing stage, cycle or phase commenced by activation of lever 102, supplies cold or cooled water from reservoir 70 to dispensing outlet/nozzle/conduit or other dispensing structure 104 so that liquid dispenser U can dispense cold or cooled water represented by arrow X in FIG. 3. The components of liquid dispensing system T can function or operate as described in U.S. Patent Publication No. 2020/0024122 with the notable exceptions of member 76 and assembly 82 which operate/function as described herein.

Referring to FIG. 7, the liquid dispenser U may include three or more dispensing conduits or other structures for dispensing three or more different beverages, (e.g., coffee or other flavored beverage, hot water and cold or cooled water). Member 110 supporting cup 112 below and adjacent dispensing structures/nozzles/conduits may be adjustable so that the height of cup 112 relative to the dispensing members/nozzles/conduits of liquid dispenser U can be readily varied or member 110 can be moved (i.e., pivoted) between a storage position and an operating position.

While this invention has been described as having a preferred design, it is understood that the preferred design can be further modified or adapted following in general the principles of the invention and including but not limited to such departures from the present invention as come within the known or customary practice in the art to which the invention pertains. The claims are not limited to the preferred embodiment and have been written to preclude such a narrow construction using the principles of claim differentiation.

I claim:

1. A liquid dispensing system for a liquid dispenser, said liquid dispensing system comprising:
   (a) a reservoir including an inlet for receiving a liquid from a liquid supply source, a chamber for storing the liquid received from the liquid supply source and an outlet for directing the liquid out of said chamber; and,
   (b) a manifold operably connected to said reservoir, said manifold including a first port through which liquid from said upper portion of said chamber and liquid from said lower portion of said chamber are directed to a first dispensing outlet so that liquid from said upper portion of said chamber and liquid from said lower portion of said chamber mix prior to being dispensed from said first dispensing outlet, said manifold further including a second port through which liquid from only said upper portion of said chamber is directed to a second dispensing outlet, and wherein the temperature of liquid directed to said first dispensing outlet is at a temperature different from the temperature of liquid directed to said second dispensing outlet.

2. The liquid dispensing system as set forth in claim 1, wherein:
   (a) said manifold further includes a liquid flow member having a first end and a second end, said first end of said liquid flow member is disposed in said lower portion of said chamber and said second end of said liquid flow member extends into said first port of said manifold.

3. The liquid dispensing system as set forth in claim 2, wherein:
   (a) said liquid flow member includes a first conduit connected to a second conduit, said first conduit extends vertically and said second conduit has a vertically extending portion and a horizontally extending portion, said horizontally extending portion of said second conduit extends into said first port of said manifold and an upper end of said first conduit is connected to said vertically extending portion of said second conduit.

4. The liquid dispensing system as set forth in claim 3, wherein:
(a) said first conduit is formed from metal and said second conduit is formed from a non-metallic material.

5. The liquid dispensing system as set forth in claim 3, wherein:
(a) said manifold includes an annular collar configured to receive an annular open throat of said reservoir, said annular collar has an annular inner sidewall, said first conduit and said vertically extending portion of said second conduit are spaced inwardly from said annular inner sidewall of said annular collar.

6. The liquid dispensing system as set forth in claim 5, wherein:
(a) said reservoir is a hot water reservoir having a heating element and said manifold includes a steam release valve moveable between an open position in which steam can be exhausted from said manifold and a closed position in which steam cannot be exhausted from said manifold.

7. The liquid dispensing system as set forth in claim 6, wherein:
(a) said steam release valve includes a float valve disposed in a float chamber, said float chamber is disposed above said reservoir, said float valve is configured to be in said closed position when liquid is at a predetermined level in said float chamber and said float valve is configured to move from said closed position to said open position when steam displaces a sufficient amount of liquid out of said float chamber; and,
(b) said float valve includes a steam outlet through which steam is exhausted from said float chamber, said float valve being configured to move from said open position to said closed position when a sufficient amount of steam has been exhausted from said float chamber.

8. The liquid dispensing system as set forth in claim 1, further including:
(a) a heating element operably connected to said reservoir to heat water stored in said chamber, and said reservoir is connected to a cold water source having chilled or cold water so that said cold water source can direct chilled or cold water into a lower end of said reservoir to force hot water stored in said reservoir out of a top portion of said reservoir and into said manifold.

9. The liquid dispensing system as set forth in claim 8, wherein:
(a) the temperature of water dispensed from said first dispensing outlet is no higher than 185° F., the temperature of water dispensed from said second dispensing outlet is in a range of 195° F. to 205° F. and the temperature of water in said upper portion of said chamber is a range of 195° F. to 205° F.

10. An apparatus for a hot water tank of a water dispensing system of a beverage dispenser for providing hot water at two different temperatures, said apparatus comprising:
(a) a liquid flow control assembly having at least a manifold configured to be operably connected to a hot water tank, said manifold including a first port through which water from an upper portion of the hot water tank and water from a lower portion of the hot water tank are directed to a first dispensing outlet so that water from the upper portion of the hot water tank and water from the lower portion of the hot water tank mix prior to being dispensed from the first dispensing outlet, said manifold further including a second port through which water from only the upper portion of the hot water tank is directed to a second dispensing outlet, and wherein the temperature of water directed to the first dispensing outlet is at a lower temperature than the temperature of water directed to the second dispensing outlet.

11. The apparatus as recited in claim 10, wherein:
(a) the second dispensing outlet directs hot water to a coffee brewing device of the beverage dispenser and the first dispensing outlet is a hot water dispensing outlet of the beverage dispenser.

12. The apparatus as recited in claim 10, wherein:
(a) said liquid flow control assembly further including a water flow member operably connected to said manifold, said water flow member having a first open end disposed in the lower portion of the hot water tank when said liquid flow control assembly is connected to the hot water tank and a second open end disposed in or adjacent said first port, said water flow member is configured to direct water from the lower portion of the hot water tank into the first port of said manifold.

13. The apparatus as recited in claim 12, wherein:
(a) said water flow member includes a first water conduit having an inlet disposed in the lower portion of the hot water tank when said liquid flow control assembly is connected to the hot water tank and a second water conduit having a first section disposed in said first port and a second section connected to an outlet of said first water conduit.

14. The apparatus as recited in claim 13, wherein:
(a) said first section of said second water conduit extends substantially perpendicular to said second section of said second water conduit and said first section of said second water conduit extends substantially parallel to said first water conduit.

15. The apparatus as recited in claim 14, wherein:
(a) said manifold includes an annular seating collar for receiving an upper portion of a throat of the hot water tank to seat said manifold on said hot water tank.

16. A coffee cooler for separately dispensing cold water, a flavored beverage and hot water, said coffee cooler including:
(a) a cold water source for providing cold or chilled water;
(b) a hot water reservoir operably connected to said cold water source to receive water from said cold water source, said hot water reservoir including a heating element to heat water stored in said hot water reservoir; and,
(c) a water flow control assembly operably connected to said hot water reservoir, said water flow assembly control being configured to provide water from only an upper portion of the hot water reservoir to a flavored beverage brewing device, said water flow control assembly further being configured to provide water to a hot water dispensing nozzle of the coffee cooler which is a mixture of water from a lower portion of said hot water reservoir and water from an upper portion of said hot water reservoir so that the temperature of the water provided to the flavored beverage brewing device is higher than the temperature of the water provided to the hot water dispensing nozzle of the coffee cooler.

17. The coffee cooler as set forth in claim 16, further including:
(a) an upright water bottle operably connected to a cold water reservoir to supply water to said cold water reservoir, said cold water reservoir being connected to said hot water reservoir to supply water to said hot water reservoir.

18. The coffee cooler as set forth in claim 16, wherein:
(a) the flavored brewing device dispenses one of coffee and tea.

19. The coffee cooler as set forth in claim 16, wherein:
(a) the flavored brewing device is configured to receive a single pod for brewing a single cup of a flavored beverage.

20. The coffee cooler as set forth in claim 16, wherein:
(a) said water flow control assembly includes a manifold mounted on said hot water reservoir, said manifold includes a first port through which water from the upper portion of the hot water reservoir and water from the lower portion of the hot water reservoir are directed to the hot water dispensing nozzle of the beverage dispenser so that water from the upper portion of the hot water reservoir and water from the lower portion of the hot water reservoir mix prior to being dispensed from the hot water dispensing nozzle of the beverage dispenser, said manifold further includes a second port through which water from only the upper portion of the hot water reservoir is directed to the flavored brewing device.

21. The coffee cooler as set forth in claim 20, wherein:
(a) said water flow control assembly further includes a first water conduit having an inlet disposed in the lower portion of the hot water reservoir and a second water conduit having a first section disposed in said first port and a second section connected to an outlet of said first water conduit wherein when water from the upper portion of said hot water reservoir is directed into and through the first port water is pulled through said first water conduit and said second water conduit from a lower portion of said hot water reservoir by a venturi effect.

* * * * *